E. J. BREWSTER.
VEHICLE SPRING.
APPLICATION FILED DEC. 5, 1914.
1,171,585.
Patented Feb. 15, 1916.
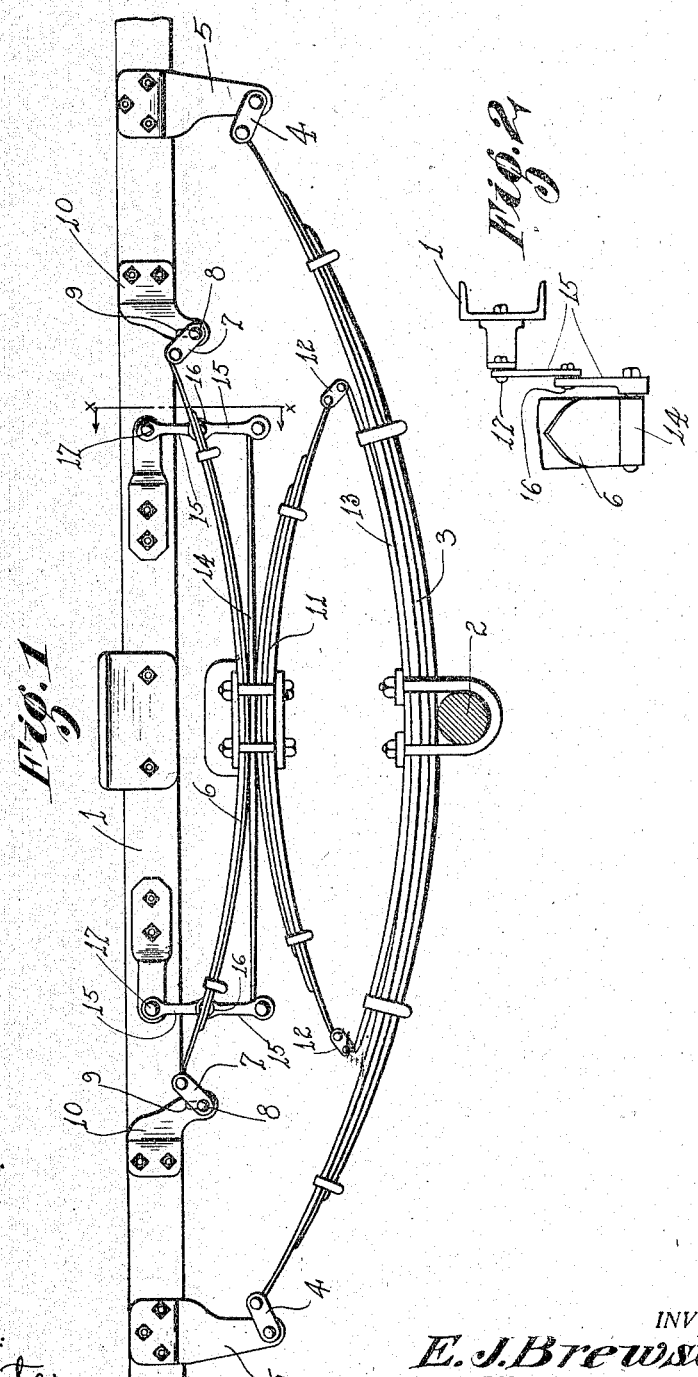
WITNESSES:
J. B. Webster
F. M. Blanchard
INVENTOR
E. J. Brewster
BY
Percy S. Webster
ATTORNEY

UNITED STATES PATENT OFFICE.

ETHELBERT J. BREWSTER, OF FRESNO, CALIFORNIA.

VEHICLE-SPRING.

1,171,585.  Specification of Letters Patent.  Patented Feb. 15, 1916.

Application filed December 5, 1914. Serial No. 875,631.

*To all whom it may concern:*

Be it known that I, ETHELBERT J. BREWSTER, a citizen of the United States, residing at Fresno, in the county of Fresno, State of California, have invented certain new and useful Improvements in Vehicle-Springs; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in vehicle springs particularly adapted for use on motor vehicles wherein jolts and jars are encountered with greater frequency than with an ordinary vehicle, the object of the invention being to have a spring consisting of a series of units, the first unit being adapted to compensate for ordinary traffic vibrations, jolts and jars, the second unit being adapted as an auxiliary structure adapted to compensate for extraordinary jolts and jars and the third unit being adapted to act as a shock absorber to compensate for any sudden upward movement of the vehicle due to encountering any very heavy or sudden jolts. In this way the vehicle may be made very comfortable and easy riding with the different units of the springs made much less rigid and stiff than where one unit is used, for all purposes. The several units are all coöperative and act in successive order and in conjunction with each other in a manner as will appear.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claims.

On the drawings, similar characters of reference indicate corresponding parts in the several views.

Figure 1 is a side elevation of the complete spring structure. Fig. 2 is a fragmentary sectional view taken on a line X—X of Fig. 1.

Referring now more particularly to the characters of reference on the drawings, the numeral 1 designates the frame of the vehicle and the numeral 2, one of the axles thereof.

In constructing my improved spring structure the first unit comprises an ordinary series of springs 3 clamped to the axle 2 in the usual manner and being at each end provided with links 4 by means of which the springs are linked to the supporting brackets 5 secured to the frame 1.

The second unit comprises a series of springs 6 interposed between the springs 3 and the frame 1 and provided at each end with links 7, the pins 8 at one end of such links 7 being movable in elongated slots 9 formed in brackets 10 secured to the frame 1. Clamped to the springs 6 are another series of springs 11 disposed in a reverse position and provided at their ends with links 12 flexibly connecting them to a spring 13 clamped to the springs 3.

The third unit of my spring structure includes the shock absorbing spring 14 which is substantially straight and is clamped between the springs 6 and 11 and is provided at each end with a pair of links 15 pivotally connected, as at 16, and connected as at 17 with the frame 1. In practice, with ordinary traffic vibrations, the frame of the vehicle 1 rides solely on the springs 3, the pins 8 on the links 7 under such conditions movable vertically through the slots 9 leaving the springs 6 and 11 inactive. With heavier jolts and jars however, the pins 8 would come to a stop at the upper ends of the slots 9 and then the springs 6 and 11 would come into action to compensate for such heavy jolts and jars. With any downward movement of the vehicle frame 1, the links 15 would break at their pivotal points 16 and fold toward each other, but with the rebound they would straighten out and pull against the spring 14 which would thus compensate for such rebound and act as a shock absorber.

From the foregoing description it can readily be ascertained that by having the unitary spring structure described, each unit performs a compensating action against the jolts and jars in successive order according to the extent of the same so that each unit may be made extremely flexible in itself to allow of easy riding qualities for the vehicle, whereas the entire structure prevents any excessive jolting of such vehicle.

From the above description it will further be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention what I claim as new and useful and desire to secure by Letters Patent is:—

1. A vehicle spring of the character described comprising the combination with a vehicle having a frame and axle, of a spring structure interposed between said frame and axle, such structure comprising units, the first unit consisting of a series of springs clamped to the axle and flexibly connected with the frame, the second unit comprising two series of springs clamped together in inverted position with respect to each other, one series of the said second unit being flexibly connected with the first unit and the other series of the second named unit being flexibly connected with the vehicle and a rebound spring interposed between the inverted springs and flexibly connected with the vehicle, as described.

2. A vehicle spring of the character described comprising the combination with a vehicle having a frame and axle, of a spring structure interposed between said frame and such axle, such spring structure being divided into units; the first unit comprising a series of springs clamped to said axle and flexibly connected with said frame, the second unit comprising a series of springs flexibly connected with said first named springs and flexibly connected with said frame, and a third unit comprising a spring clamped between said second named springs and being linked to said frame, as described.

3. A vehicle spring of the character described comprising the combination with a vehicle having a frame and axle, of a spring structure interposed between the frame and axle, such spring structure being divided into units, the first unit comprising a series of springs clamped to the axle and flexibly connected with the frame, the second unit comprising a series of springs connected with the first-named springs and flexibly connected with the frame, the third unit comprising a rebound spring clamped between said second named springs, and a pair of links connected at each end of said rebound spring and to said vehicle, the members of each pair of links being pivotally connected together, as described.

In testimony whereof I affix my signature in presence of two witnesses.

ETHELBERT J. BREWSTER.

Witnesses:
W. G. WHARTON,
CHAS. JUANOVICH.